(12) United States Patent
Inoue

(10) Patent No.: US 10,311,617 B2
(45) Date of Patent: Jun. 4, 2019

(54) OPERATION SUPPORT DEVICE, OPERATION SUPPORT METHOD, AND NON-TRANSITORY COMPUTER READABLE RECORDING MEDIUM

(71) Applicant: NS SOLUTIONS CORPORATION, Tokyo (JP)

(72) Inventor: Kazuyoshi Inoue, Tokyo (JP)

(73) Assignee: NS SOLUTIONS CORPORATION, Tokyo (JP)

( * ) Notice: Subject to any disclaimer, the term of this patent is extended or adjusted under 35 U.S.C. 154(b) by 0 days.

(21) Appl. No.: 15/753,083

(22) PCT Filed: Jun. 16, 2016

(86) PCT No.: PCT/JP2016/067866
§ 371 (c)(1),
(2) Date: Feb. 15, 2018

(87) PCT Pub. No.: WO2017/033539
PCT Pub. Date: Mar. 2, 2017

(65) Prior Publication Data
US 2019/0012819 A1 Jan. 10, 2019

(30) Foreign Application Priority Data

Aug. 25, 2015 (JP) .................. 2015-166259

(51) Int. Cl.
*G06T 19/00* (2011.01)
*G06T 11/60* (2006.01)
(Continued)

(52) U.S. Cl.
CPC .......... *G06T 11/60* (2013.01); *G02B 27/0172* (2013.01); *G06F 3/011* (2013.01);
(Continued)

(58) Field of Classification Search
CPC .............................. G06T 19/006; G06T 11/60
See application file for complete search history.

(56) References Cited

U.S. PATENT DOCUMENTS

2010/0189322 A1\* 7/2010 Sakagawa ............. G06F 19/321
382/128
2013/0120449 A1 5/2013 Ihara et al.
(Continued)

FOREIGN PATENT DOCUMENTS

JP 2011-248860 A 12/2011
JP 2012-198644 A 10/2012
(Continued)

OTHER PUBLICATIONS

International Preliminary Report on Patentability of related International Patent Application No. PCT/JP2016/067866 dated Mar. 8, 2013.
(Continued)

*Primary Examiner* — Ryan R Yang
(74) *Attorney, Agent, or Firm* — Arent Fox LLP

(57) ABSTRACT

Included are: an acceptor configured to accept an operation result of success or failure of an operation by an operator, the operation result being obtained in a case where an optical see-through displayer worn by the operator displays a support image candidate for the operation by the operator superimposed on a reality space; a storing unit configured to store each support image candidate out of a plurality of the support image candidates for the operation and the operation result in a memory, associating the support image candidate with the operation result being in a case where the support image is displayed; and a selector configured to select the support image candidate to be set as the support image of the operation from among the plurality of the support image candidates, based on the operation result.

17 Claims, 14 Drawing Sheets

(51) Int. Cl.
    *G09G 5/00* (2006.01)
    *G09B 19/00* (2006.01)
    *G02B 27/01* (2006.01)
    *G06F 3/01* (2006.01)

(52) U.S. Cl.
    CPC ............... *G09B 19/00* (2013.01); *G09G 5/00* (2013.01); *G02B 2027/014* (2013.01); *G02B 2027/0138* (2013.01); *G02B 2027/0178* (2013.01)

(56) References Cited

U.S. PATENT DOCUMENTS

| | | | |
|---|---|---|---|
| 2014/0168266 A1 | 6/2014 | Kimura | |
| 2016/0176724 A1* | 6/2016 | Ji | G06Q 10/06 700/282 |
| 2017/0004652 A1* | 1/2017 | Koga | G06K 9/00671 |

FOREIGN PATENT DOCUMENTS

| | | |
|---|---|---|
| JP | 2012-234406 A | 11/2012 |
| JP | 2014-119786 A | 6/2014 |

OTHER PUBLICATIONS

International Search Report of related International Patent Application No. PCT/JP2016/067866 dated Aug. 2, 2016.

\* cited by examiner

| OPERATION ID | OPERATION CONTENT |
|---|---|
| T01 | APPARATUS MANIPULATION A |
| T02 | APPARATUS MANIPULATION B |
| T03 | FINISHED PRODUCT ASSEMBLY A |
| T04 | FINISHED PRODUCT ASSEMBLY B |
| T05 | INTERMEDIATE PRODUCT ASSEMBLY A |
| T06 | INTERMEDIATE PRODUCT ASSEMBLY B |
| T07 | SECONDARY PROCESSING A |
| T08 | SECONDARY PROCESSING B |
| T09 | PRIMARY PROCESSING A |
| T10 | PRIMARY PROCESSING B |
| T11 | INSPECTION/CHECKING |
| T12 | WASHING/CLEANING |
| ... | ... |

| OPERATION ID | CANDIDATE ID | SUPPORT IMAGE CANDIDATE |
|---|---|---|
| T01 | I01 | A (COLLECTIVE) |
| T01 | I02 | B (COLLECTIVE) |
| T01 | I03 | C (UNIT BY ACTION) |
| ... | ... | |

FIG.9

| OPERATOR ID | OPERATOR INFORMATION ||||
| | BIRTH DATE | GENDER | NATIONALITY | OPERATION START YEAR |
|---|---|---|---|---|
| A01 | 1995/10/1 | MALE | JPN | 2014(T01), 2013(T02)··· |
| A02 | 1980/10/3 | MALE | JPN | 2011(T01), 2012(T04)··· |
| ··· | ··· | ··· | ··· | ··· |

| OPERATOR ATTRIBUTE CODE | OPERATOR ATTRIBUTE |||||
| | AGE GROUP | GENDER | NATIONALITY | ··· | YEARS OF EXPERIENCE |
|---|---|---|---|---|---|
| J11 | TEEN | MALE | JPN | ··· | LESS THAN 1 YEAR |
| : | : | : | : | | |
| J31 | 30'S | MALE | JPN | ··· | 1 TO 5 YEARS |
| J32 | 30'S | MALE | JPN | ··· | 5 TO 10 YEARS |
| : | : | : | : | | |
| T11 | TEEN | MALE | TH | ··· | 1 TO 5 YEARS |
| : | : | : | : | | |

333

| OPERATION ID | CANDIDATE ID | OPERATION START DATE AND TIME | OPERATION END DATE AND TIME | OPERATION TIME | OPERATOR ATTRIBUTE CODE | OPERATION RESULT |
|---|---|---|---|---|---|---|
| T01 | I01 | 2015/1/6 9:00 | 2015/1/6 9:10 | 10min | J11 | × |
| T01 | I01 | 2015/1/6 10:00 | 2015/1/6 10:09 | 9min | J31 | ○ |
| T01 | I01 | 2015/1/6 15:00 | 2015/1/6 15:09 | 9min | J32 | ○ |
| ... | ... | ... | ... | ... | ... | ... |
| T01 | I02 | 2015/1/14 10:00 | 2015/1/14 10:08 | 8min | J33 | ○ |
| T01 | I02 | 2015/1/14 13:00 | 2015/1/14 10:07 | 7min | J11 | ○ |
| ... | ... | ... | ... | ... | ... | ... |
| T01 | I03 | 2015/1/20 11:00 | 2015/1/20 11:07 | 7min | J11 | ○ |
| ... | ... | ... |  | ... | ... | ... |

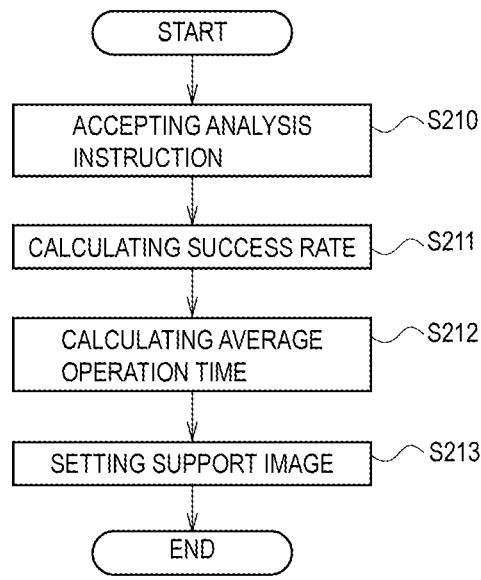

| TIME ZONE | 9~10 | 10~11 | 11~12 | ... |
|---|---|---|---|---|
| SUCCESS RATE | 70% | 80% | 75% | ... |

FIG.18

OPERATION ID: T01 (APPARATUS MANIPULATION A)   TARGET PERIOD: MONTH(○), 20XX

| DATE | OPERATION INSTRUCTION PATTERN | OPERATION TIME | SUCCESS/ FAILURE (YIELD) | REMARKS |
|---|---|---|---|---|
| MONTH(○), DATE (△), 20XX | A (COLLECTIVE) | 15min | SUCCESS | VITAL NORMAL |
| MONTH(○), DATE (□), 20XX | B (COLLECTIVE) | 10min | SUCCESS | VITAL NORMAL |
| MONTH(○), DATE (✻), 20XX | C (UNIT BY ACTION) | 8min | SUCCESS | VITAL NORMAL |
| MONTH(○), DATE (▲), 20XX | A (COLLECTIVE) | 20min | SUCCESS | VITAL ABNORMAL |
| : | : | : | : | : |
| : | : | : | : | : |

<ANALYSIS RESULT>

A (COLLECTIVE)      AVERAGE OPERATION TIME 15min    SUCCESS RATE 75%

B (COLLECTIVE)      AVERAGE OPERATION TIME 10min    SUCCESS RATE 87%

C (UNIT BY ACTION)  AVERAGE OPERATION TIME 8min     SUCCESS RATE 99%

OPERATION SUPPORT DEVICE, OPERATION SUPPORT METHOD, AND NON-TRANSITORY COMPUTER READABLE RECORDING MEDIUM

CROSS-REFERENCE TO RELATED APPLICATIONS

This application is a National Stage entry of International Application No. PCT/JP2016/067866, filed Jun. 16, 2016, which claims priority to Japanese Patent Application No. 2015-166259, filed Aug. 25, 2015. The disclosures of the priority applications are incorporated in their entirety herein by reference.

TECHNICAL FIELD

The present invention relates to an operation support device, an operation support method, and a non-transitory computer readable recording medium.

BACKGROUND ART

In recent years, an operation support technology using an augmented reality (hereinafter, AR) technology is known. As a technology for operation support, Patent Literature 1 discloses a technology to display information related to a failure recovery operation superimposed on a reality space, in a wearable AR display device worn by an operator.

CITATION LIST

Patent Literature

Patent Literature 1: Japanese Laid-open Patent Publication No. 2011-248860

SUMMARY OF INVENTION

Technical Problem

However, in a conventional technology, it is unclear how much contribution is given to support of an actual operation by operation support information displayed on an AR display device, and there was a problem that appropriate information was not always displayed.

The present invention is made in view of the problem as above, and its object is to make an operation using AR display further efficient.

Solution to Problem

Thus, the present invention is an operation support device including: an acceptor configured to accept an operation result of success or failure of an operation by an operator, the operation result obtained in a case where an optical see-through displayer worn by the operator displays a support image candidate for the operation by the operator superimposed on a reality space; a storing unit configured to store each support image candidate out of a plurality of the support image candidates for the operation and the operation result in a memory, associating the support image candidate with the operation result being in a case where the support image candidate is displayed; and a decider configured to decide the support image candidate to be the support image of the operation from among the plurality of the support image candidates, based on the operation result.

Advantageous Effects of Invention

According to the present invention, it is possible to make an operation using AR display further efficient.

BRIEF DESCRIPTION OF DRAWINGS

FIG. 4 is a table illustrating an example of an operation table;
FIG. 5 is a table illustrating an example of a support image table;
FIG. 9 is a table illustrating an example of an operator table;
FIG. 10 is a table illustrating an example of an operator attribute table;
FIG. 13 is a flowchart illustrating a support image setting processing;
FIG. 14 is a table illustrating an example of an average operation time and a success rate of the support image candidate;
FIG. 18 is an explanatory diagram of a sixth modification example.

DESCRIPTION OF EMBODIMENTS

Hereinafter, embodiments of the present invention will be described based on the drawings.

Figure 1:
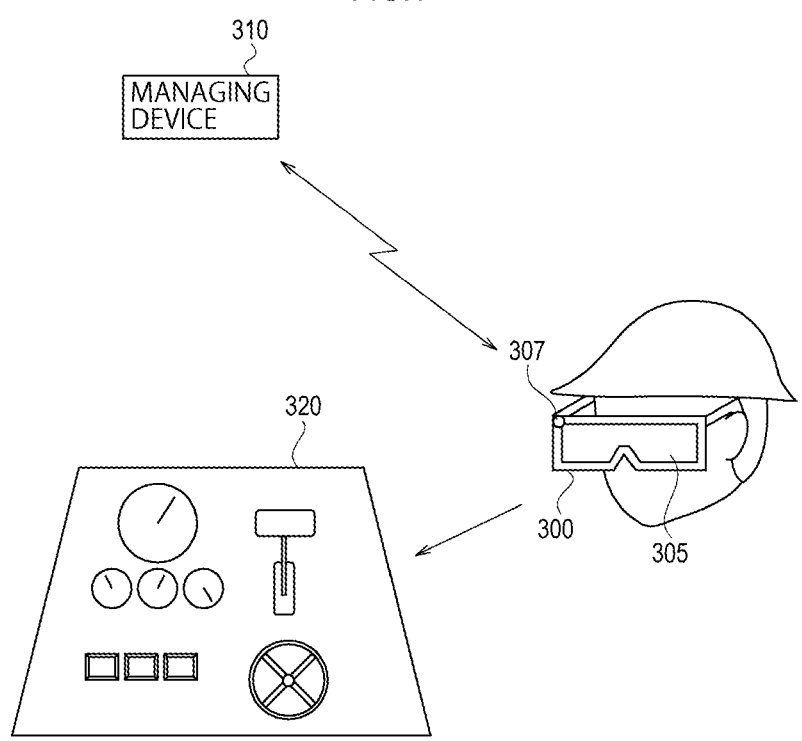
FIG. 1 is a diagram illustrating an operation support system.

FIG. 1 is a diagram illustrating an operation support system according to this embodiment. The operation support system has an augmented reality (hereinafter, referred to as AR) display device 300 and a managing device 310 as an operation support device. The AR display device 300 is a glasses-type device. In this embodiment, an operator performs an operation in a factory while wearing the AR display device 300. As the operation, a manipulation of an apparatus 320 can be cited, for example.

The AR display device 300 is also an optical see-through displayer, which is provided with an optical see-through display unit 305 at a position corresponding to a lens part of glasses. The operator wearing the AR display device 300 can see an object which exists ahead of a line of sight, in a reality space, via the display unit 305 of the AR display device 300. Further, since an arbitrary image is displayed on the display unit 305, the operator wearing the AR display device 300 can recognize a state where the arbitrary image is superimposed on the reality space viewed through the display unit 305, that is, an augmented reality space (AR space). The AR display device 300 is a display device capable of displaying an image superimposed on a reality space. The AR display device 300 according to this embodiment displays a support image or the like for supporting an operation on the display unit 305 at the time of the operation by the operator.

Further, a photographing unit 307 is provided at a position adjacent to the display unit 305. The photographing unit 307 is provided in a manner that a sight line direction of a wearer of the AR display device 300 coincides with a photographing direction of the photographing unit 307 coincide, in terms of a relationship with the photographing direction. Thereby, the photographing unit 307 can photograph an image of the reality space viewed by the operator wearing the AR display device 300. Note that as another example, the photographing unit 307 may be provided in a manner that the photographing direction and the sight line direction of the wearer have a constant relationship.

The managing device 310 manages information which the AR display device 300 displays. The AR display device 300 is capable of communicating with the managing device 310 via a network. The managing device 310 stores a support image, for example, and transmits the support image to the AR display device 300. The managing device 310 also stores a support image candidate to be a candidate for the support image, and selects the support image from the support image candidates, based on an operation result of success or failure of the operation by the operator in a case where the support image candidate is displayed, and sets this support image as the support image of the operation.

Figure 2:
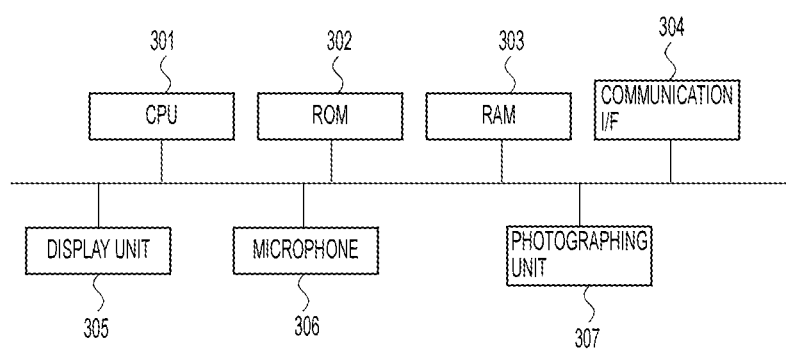
FIG. 2 is a diagram illustrating an AR display device.

FIG. 2 is a diagram illustrating the AR display device 300. The AR display device 300 has a CPU 301, a ROM 302, a RAM 303, a communication I/F 304, the display unit 305, a microphone 306, and the photographing unit 307. The CPU 301 reads a control program stored in the ROM 302 and executes various processings. The RAM 303 is used as a main memory of the CPU 301 and a temporary storage area of a work area or the like. Note that later-described function and processing of the AR display device 300 are enabled by the CPU 301 reading the program stored in the ROM 302 and executing the program.

The communication I/F 304 performs a communication processing with the managing device 310 via the network. The display unit 305 displays various information. The microphone 306 inputs voice such as speech of the operator who wears the AR display device 300. Note that the voice is transmitted to the CPU 301 and a voice recognition processing is performed in the CPU 301. The CPU 301 can accept various instructions by a user, from a result of voice recognition. The photographing unit 307 performs photographing of the reality space.

Figure 3:
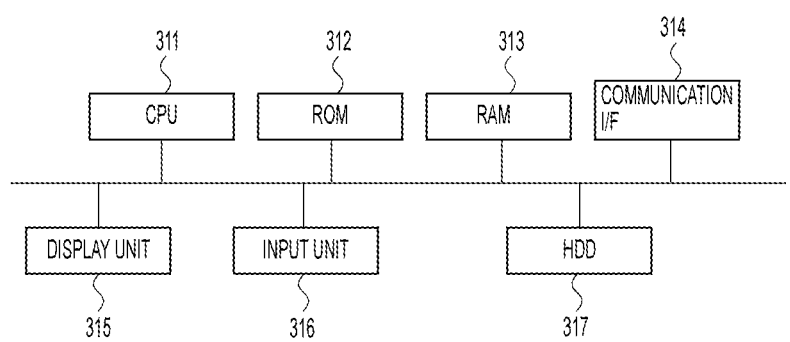
FIG. 3 is a diagram illustrating a managing device.

FIG. 3 is a diagram illustrating the managing device 310. The managing device 310 is an example of a computer, and has a CPU 311, a ROM 312, a RAM 313, a communication I/F 314, a display unit 315, an input unit 316, and an HDD 317. The CPU 311, the ROM 312, the RAM 313, and the communication I/F 314 are similar to the CPU 301, the ROM 302, the RAM 303, and the communication I/F 304, respectively. The display unit 315 displays various information. The input unit 316 has a keyboard or a mouse, and accepts various manipulations by the user. The HDD 317 stores data, various programs, and so on. Later-described function and processing of the managing device 310 are enabled by the CPU 311 reading the program stored in the ROM 312 or the HDD 317 and executing the program.

Next, there will be described the information which the managing device 310 stores in a memory such as the HDD 317. FIG. 4 is a table illustrating an example of an operation table 330. The operation table 330 stores an operation ID and an operation content in association with each other. Here, the operation content is information indicating a content of an operation performed by an operator. In the example illustrated in FIG. 4, stored as the operation contents are apparatus manipulation, finished product assembly, intermediate product assembly, secondary processing, inspection/checking, and washing/cleaning. Note that the operation ID is identification information of the operation content. Note that an apparatus manipulation A listed in FIG. 4 indicates a manipulation to the apparatus 320 illustrated in FIG. 1.

FIG. 5 is a table illustrating an example of a support image table 331. The support image table 331 stores the operation ID, a candidate ID, and the support image candidate, in association with one another. Here, the support image candidate is a candidate image of the support image to be displayed on the display unit 305 of the AR display device 300 at the time of the operation. The candidate ID is identification information of the support image candidate. In the example of FIG. 5, a plurality of support image candidates are associated with the operation ID "T01". As described above, the support image table 331 stores one support image candidate or a plurality of support image candidates in association with one operation. Here, the support image candidate includes one image or two or more images. Further, in this embodiment, the support image candidate is a still image, but the support image candidate may be a moving image or an animation image, as another example. In this embodiment, the support image candidate "A" or "B" includes only one image, while the support image candidate "C" includes a plurality of images.

Figure 6A:
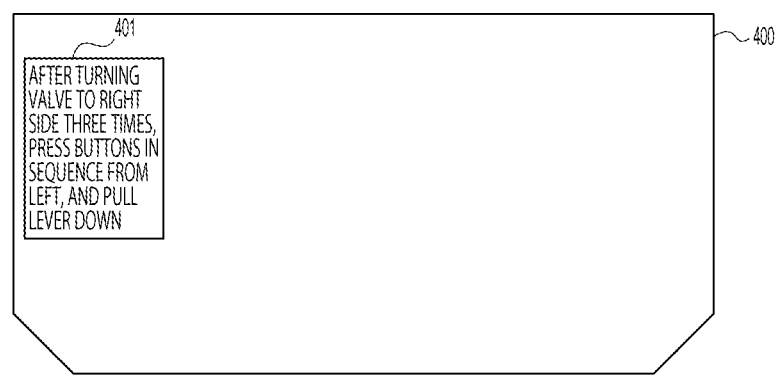
FIG. 6A is an explanatory diagram of a support image candidate.
Figure 6B:
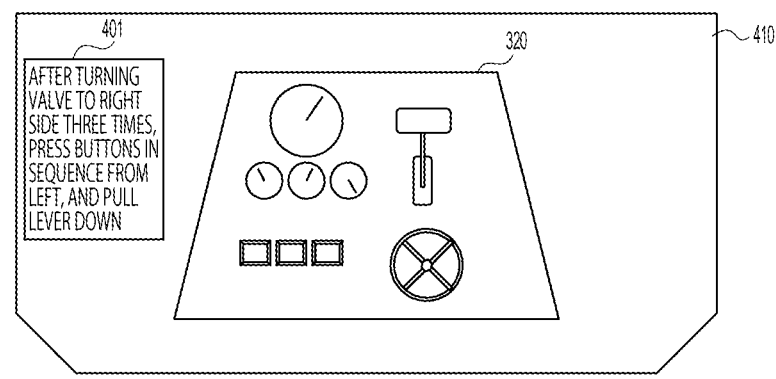
FIG. 6B is an explanatory diagram of a support image candidate.

Here, the support image candidate will be described. FIG. 6A is a diagram illustrating an example of the support image candidate 400 of "A". The support image candidate 400 is an image for supporting the manipulation of the apparatus 320, and is displayed on the display unit 305 when the operator stands in front of the apparatus 320. The support image candidate illustrated in FIG. 6A includes an image 401 indicating a support content. FIG. 6B is a diagram illustrating an AR space 410 in which the support image candidate 400 illustrated in FIG. 6A is superimposed on the apparatus 320 existing in the reality space. Since the operator can grasp the AR space 410 illustrated in FIG. 6B, the operator can perform a manipulation (operation) while referring to the content displayed on the display unit 305, without moving the line of sight from the apparatus 320 being an operation target.

Figure 7:
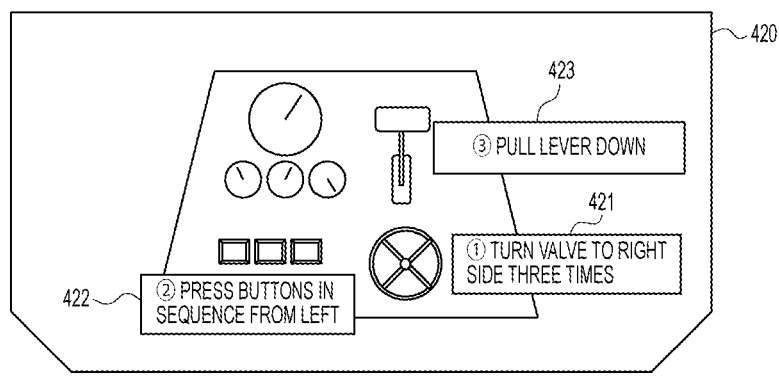
FIG. 7 is an explanatory diagram of a support image candidate.

FIG. 7 is a diagram illustrating a display example of the support image candidate 420 of "B". Note that FIG. 7 illustrates a state where the support image candidate 420 is superimposed on the apparatus 320 existing in the reality space. The support image candidate 420 includes three images 421, 422, 423 indicating respective support contents of three operations to be performed to the apparatus 320. The images 421, 422, 423 are displayed at positions close to operation targets, respectively.

Figure 8A:
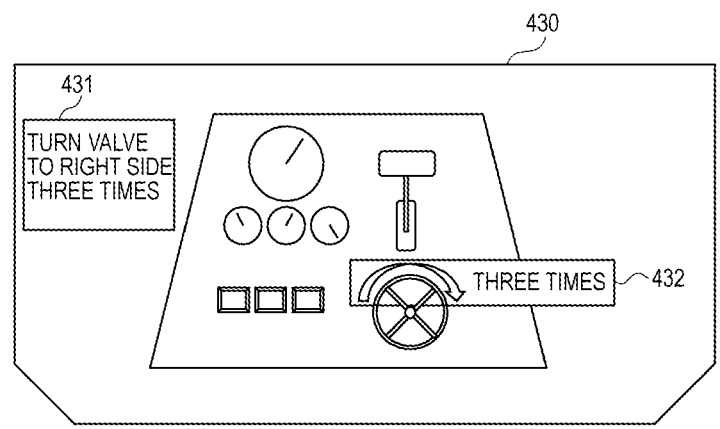
FIG. 8A is an explanatory diagram of a support image candidate.
Figure 8B:
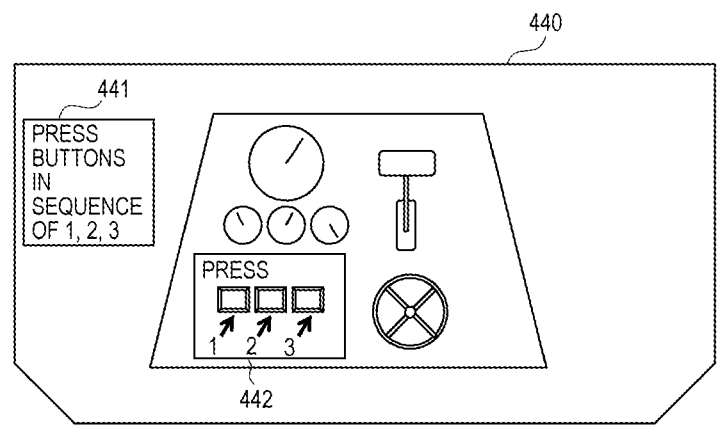
FIG. 8B is an explanatory diagram of a support image candidate.
Figure 8C:
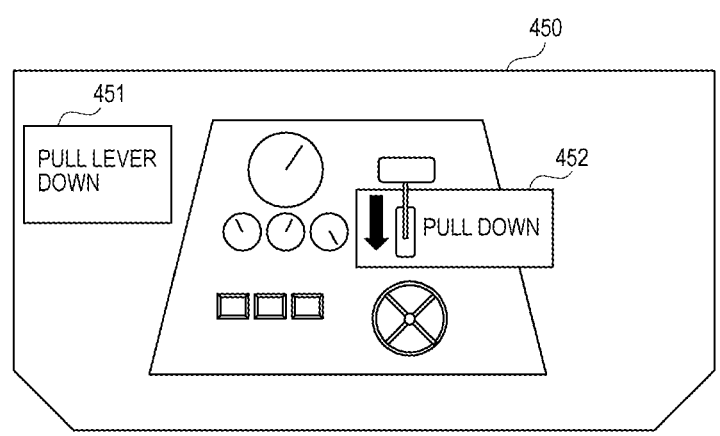
FIG. 8C is an explanatory diagram illustrating a support image candidate.

FIG. 8A, FIG. 8B, and FIG. 8C are diagrams illustrating three images 430, 440, 450 included in the support image candidate of "C", respectively. The operation content "apparatus manipulation A" includes three operations, and in correspondence therewith, the support image candidate of "C" includes three images 430, 440, 450 corresponding to the respective operations. The image 430 illustrated in FIG. 8A includes two images 431, 432 indicating the first operation content. The image 440 illustrated in FIG. 8B includes two images 441, 442 indicating the second operation content. The image 450 illustrated in FIG. 8C includes two images 451, 452 indicating the third operation content.

Note that the CPU 301 of the AR display device 300 photographs an image (moving image or still image) at the time of manipulation and detects completion of each operation by a processing such as gesture recognition to the photographed image. Then, the CPU 301 displays the image, while switching display of the display unit 305 from the image 430 to the image 440, and from the image 440 to the image 450, at timings of detection of operation completion. As described above, the respective support image candidates are image information for supporting operations by methods and display contents different from one another.

Note that the operation table 330 and the support image table 331 are set and registered by a designer or the like at the time of designing of the managing device 310, for example. Further, records of the operation table 330 and the support image table 331 can be appropriately added, altered, or deleted by the CPU 311 in accordance with a manipulation by a manager or the like.

FIG. 9 is a table illustrating an example of an operator table 332. The operator table 332 stores an operator ID and operator information in association with each other. The operator information is information related to the operator. In this embodiment, the operator information includes a birth date, a gender, a nationality, and an operation start year. The operation start year is information indicating the year when the operator started each operation. The example illustrated in FIG. 9 indicates that the operator of "A01" started the operation of "T01" in 2014 and started the operation of "T02" in 2013. Note that the operator table 332 is set and registered by the designer or the like at the time of designing of the managing device 310, for example. Further, a record of the operator table 332 can be appropriately added, altered, or deleted in accordance with a manipulation by the manager or the like. For example, it is assumed that the operator gets engaged in a new operation. In this case, the CPU 311 registers, in the operator table 332, an operation ID and an operation start year of the operation in which the operator gets engaged, in association with the operator ID of the operator in the operator table 332, in accordance with a manipulation of the manager or the like.

FIG. 10 is a table illustrating an example of an operator attribute table 333. The operator attribute table 333 stores an operator attribute code and an operator attribute in association with each other. Here, the operator attribute is type information for classifying the operators in accordance with features of the operators. In this embodiment, the operator attribute includes an age group, a gender, a nationality, and years of experience, but concrete contents of the operator attribute should not be limited to the embodiment. The managing device 310 can specify to which operator attribute each operator belongs by comparing the operator information registered in the operator table 332 and the operator attribute registered in the operator attribute table 333.

Note that the operator attribute table 333 is set and registered by a processing by the CPU 311 in accordance with a manipulation by the designer or the like, at the time of designing of the managing device 310, for example.

Further, a record of the operator attribute table 333 can be appropriately added, altered, or deleted by the CPU 311 in accordance with a manipulation by the manager or the like.

Figure 11:
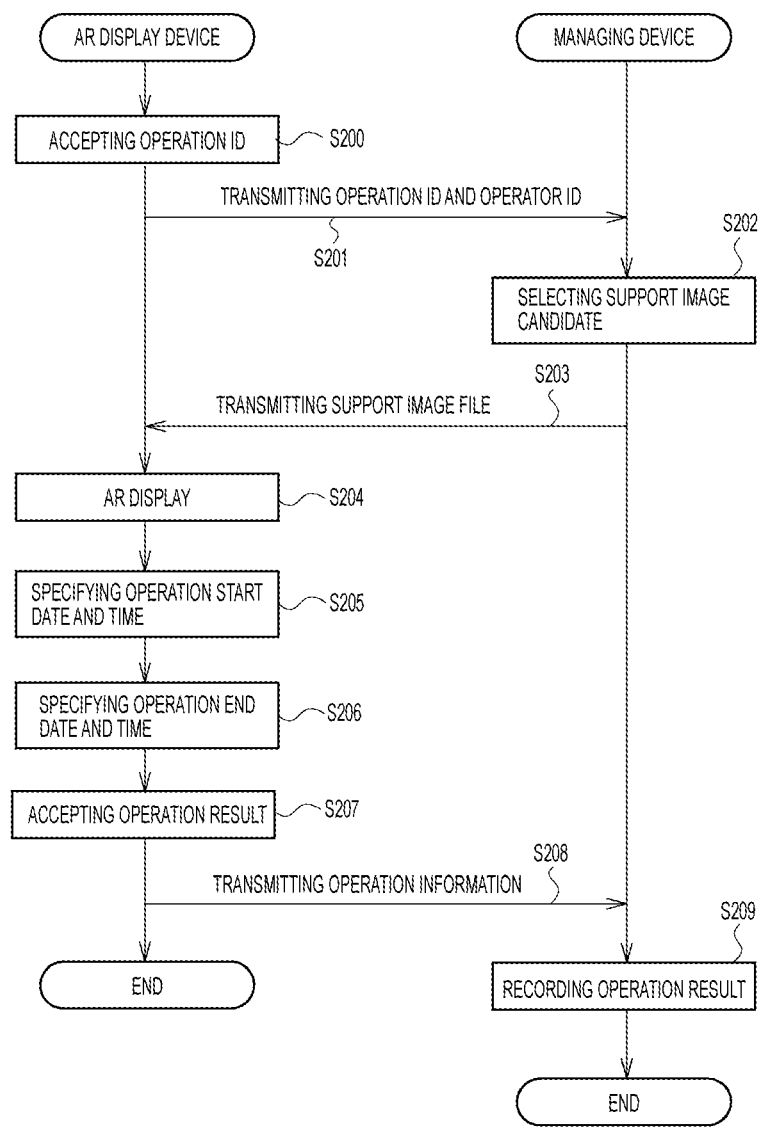
FIG. 11 is a flowchart illustrating a processing of an operation support system.

FIG. 11 is a flowchart illustrating a processing of the operation support system. When the operator wearing the AR display device 300 approaches the apparatus 320 to operate, the CPU 301 of the AR display device 300 recognizes a two-dimensional code given to the apparatus 320, from a photographed image photographed by the photographing unit 307. Here, in the two-dimensional code is indicated the operation ID of the operation content to be performed in the apparatus 320. In S200, the CPU 301 of the AR display device 300 accepts the operation ID corresponding to the two-dimensional code. Next, in S201, the CPU 301 of the AR display device 300 transmits the operation ID and the operator ID in association with each other, to the managing device 310. Note that the operator ID is stored in the ROM 302 or the like of the AR display device 300 in advance.

Note that a processing for accepting the operation ID by the AR display device 300 should not be limited to the embodiment. As another example, the CPU 301 may accept the operation ID which is input by speech by the operator.

Next, in S202, the CPU 311 of the managing device 310 specifies a plurality of support image candidates associated with the operation ID which has been received, while referring to the support image table 331. Then, the CPU 311 selects one support image candidate from the plurality of support image candidates having been specified. Next, in S203, the CPU 311 of the managing device 310 transmits the support image candidate selected in S202 to the AR display device 300. When the CPU 311 receives the operation ID "T01", for example, the CPU 311 specifies the support image candidates "A" to "C" associated with the operation ID "T01", in the support image table 331 illustrated in FIG. 5. Then, the CPU 311 selects one support image candidate from the support image candidates "A" to "C". Note that which support image candidate is to be selected will be described later.

Next, in S204, the CPU 301 of the AR display device 300 displays the received support image candidate superimposed on the apparatus 320 existing in the reality space. More specifically, the CPU 301 picks out the image of the operation target, by image recognition, from the photographed image photographed by the photographing unit 307, and specifies a position of the image of the operation target (apparatus 320) in the photographed image. Then, the CPU 301 displays the support image candidate superimposed on the apparatus 320, based on a relationship between a photographing direction and a visual line direction.

Next, in S205, the CPU 301 of the AR display device 300 specifies an operation start date and time. More specifically, in a case where predetermined speech meaning start of the operation such as "operation start" by the operator is input to the microphone 306, the CPU 301 specifies an input timing of this speech as the operation start date and time. Next, in S206, the CPU 301 of the AR display device 300 specifies an operation end date and time. More specifically, in a case where predetermined speech meaning end of the operation such as "operation end" by the operator is input to the microphone 306, the CPU 301 specifies an input timing of this speech as the operation end date and time.

Next, in S207, the CPU 301 of the AR display device 300 accepts an operation result having been input by the operator. Here, the operation result is information indicating success or failure of the operation. When the operation is completed normally, the operator inputs success of the operation. When the operation is not completed normally, such as in a case where the operation is not completed or an erroneous operation is performed, the operator inputs failure of the operation. Next, in S208, the CPU 301 of the AR display device 300 transmits operation information to the managing device 310. Here, the operation information includes the operation start date and time, the operation end date and time, and the operation result. In response thereto, the CPU 311 of the managing device 310 receives the operation information. In other words, a processing of S208 is an example of a reception processing to receive the operation result. Next, in S209, the CPU 311 of the managing device 310 stores the operation result in an operation result table, in association with the operation ID.

Note that the managing device 310 may receive the operation information from a device other than the AR display device 300. For example, in a case where the apparatus 320 being the operation target can detect the operation start date and time and the operation end date and time, the managing device 310 may receive the operation start date and time and the operation end date and time from the apparatus 320 being the operation target. Further, the operator may input the operation result to the apparatus 320 being the operation target so that the managing device 310 may receive the operation result from the apparatus 320. Further, as another example, a supervisor who supervises the operation may input a result to a device such as a PC so that the managing device 310 may receive the operation result from the device such as the PC, in association with an operation start date and time or an operation end date and time.

Figure 12:
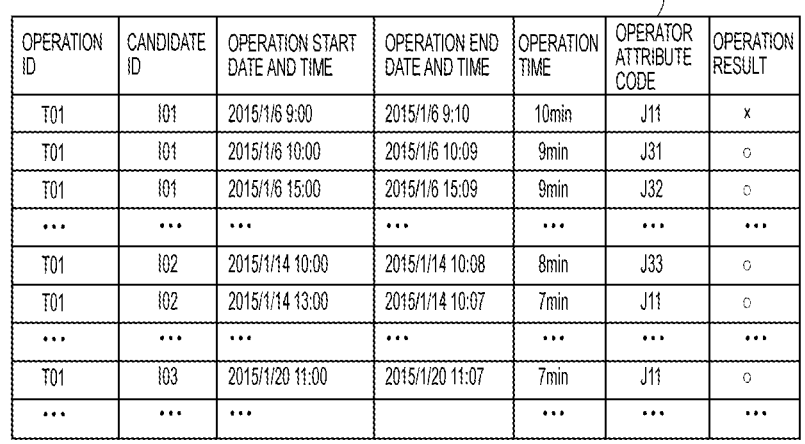
FIG. 12 is a table illustrating an example of an operation result table.

FIG. 12 is a table illustrating an example of an operation result table 334. The operation result table 334 stores the operation ID, the candidate ID, the operation start date and time, the operation end date and time, an operation time, an operator attribute code, and the operation result, in association with one another. In S209, the CPU 301 stores the candidate ID, the operation start date and time, the operation end date and time, the operation time, the operator attribute code, and the operation result, in association with the operation ID received in S201. In other words, the CPU 301 stores the candidate ID of the support image candidate specified in S201. Further, the CPU 301 stores the operation start date and time, the operation end date and time, and the operation result included in the operation information received in S208. Further, the CPU 301 specifies the operator attribute ID from the operator information (FIG. 9) associated with the operator ID received in S201, while referring to the operator attribute table 333, and stores the operator attribute ID having been specified. Further, the CPU 301 finds the operation time from the operation start date and time and the operation end date and time, and stores the operation time having been found.

The operation support system performs the processing illustrated in FIG. 11, every time one operator or two or more operators perform(s) the operation of "apparatus manipulation A" specified by the operation ID "T01" to the apparatus 320. Thereby, as illustrated in FIG. 12, it is possible to store information such as the operation result in association with each of the plurality of support image candidates.

In order to store the operation result for each support image candidate stored in the support image table, the managing device 310 performs the following processing, for example. In other words, the CPU 311 of the managing device 310 makes setting such that in S202 the support image candidate "A" is selected in the first week, the support image candidate "B" is selected in the second week, and the support image candidate "C" is selected in the third week, with an arbitrary date being a start date, for example. Thereby, at the time that three weeks have passed, it is possible to obtain an operation result table in which the operation result of one week for each operation image candidate is stored. Here, a processing of S209 is an example of a storing processing to store each support image candidate out of a plurality of the support image candidates for the operation and the operation result in a memory, associating the support image candidate with the operation result being in a case where the support image is displayed.

FIG. 12 illustrates only the operation result for the operation content "apparatus operation A" identified by the operation ID "T01", but in a case where another operation is performed, the operation result for another operation content is also stored similarly in the operation result table 334.

FIG. 13 is a flowchart illustrating a support image setting processing by the managing device 310. After the operation result is stored in the operation result table 334 in the processing illustrated in FIG. 11, the managing device 310 accepts an input of an analysis instruction from the manager or the like in S210. Next, the CPU 311 of the managing device 310 performs processings of S211 and S212 as analysis processings to analyze the operation result. In other words, in S211, the CPU 311 of the managing device 310 specifies a success rate for each support image candidate, based on the information stored in the operation result table 334 (success rate specification processing). Here, the success rate is a proportion of the number of operations having successful operation results in a case where the support image candidate is displayed, to the total number of the operations performed with the support image candidate being displayed. More specifically, the CPU 311 of the managing device 310 calculates the number of records of successful operation results in relation to the total number of records associated with respective candidate ID's, as the success rate.

Next, in S212, the CPU 311 of the managing device 310 calculates an average operation time for each support image candidate, based on the operation time associated with each candidate ID, in the operation result table 334. FIG. 14 is a table illustrating the average operation time and success rate calculated for each of the three support image candidates (candidate ID's "I01", "I02", "I03") associated with the operation content "apparatus manipulation A" of the operation ID "T01".

Next, in S213, the CPU 311 of the managing device 310 decides the support image candidate to set as the support image to the operation from among the plurality of support image candidates associated with one operation, while referring to the average operation time and the success rate (deciding processing). More specifically, the CPU 311 decides the support image candidate whose average operation time is short and whose successes rate is high, as the support image. It suffices that the CPU 311 decides the support image based on the operation result and the operation time, and a processing for deciding should not be limited to the embodiment. Further, the CPU 311 may decide the support image based only on the operation result.

In S213, further, the CPU 311 stores the candidate ID of the support image candidate decided as the support image, in association with the operation ID. Then, the support image setting processing is completed. Thereafter, when receiving the operation ID from the AR display device 300, the CPU 311 of the managing device 310 transmits the support image which has been stored in association with the operation ID, to the AR display device 300 (transmission processing). Thereby, the AR display device 300 can display the appropriate support image having been set to the operation, at the time of the operation by the operator.

As described above, in this embodiment, the operation is performed by the operator wearing the AR display device 300, and the AR display device 300 displays the support image candidate superimposed on the reality space, at the time of operation. Then, the managing device 310 can set the appropriate support image to the operation, based on the operation result of the case where the operation image candidate is displayed. Thereby, the operator becomes able to perform the operation while looking at the appropriate support image. In other words, the operation support system according to this embodiment can make an operation using AR display further efficient.

As a first modification example of this embodiment, a managing device 310 may perform analysis processing (success rate calculation processing (S211) and calculation of an average operation time (S212) of FIG. 13), after eliminating an operation result at the time that an operator is in poor physical condition, based on biometrics information of the operator. More specifically, the operator further wears a detector (not-shown) detecting biometrics information together with an AR display device 300. In this example, the biometrics information includes a pulse, a maximum blood pressure, a minimum blood pressure, and a body temperature, of the wearer, but the biometrics information should not be limited to the above.

Figure 15:
FIG. 15 is a table illustrating an example of a biometrics information table.

Then, a CPU 311 of the managing device 310 periodically receives an operator ID, a detection date and time, and the biometrics information of the wearer from the detector, and stores the above in a biometrics information table 336. FIG. 15 is a table illustrating an example of the biometrics information table 336. The biometrics information table 336 stores the operator ID, the detection date and time, and the biometrics information, in association with one another. Further, in the memory such as the HDD 317 of the managing device 310, there are preset normal ranges of respective values (pulse, maximum blood pressure, minimum blood pressure, and body temperature) included in the biometrics information. The CPU 311 of the managing device 310 specifies the detection date and time when the biometrics information indicating a value outside the normal range is obtained. Then, the CPU 311 specifies a record that includes the detection date and time when the biometrics information indicating the value outside the normal range is obtained in an operation time zone, as an exception record, while referring to an operation result table 334. Then, in S211 and S212, the CPU 311 of the managing device 310 calculates a success rate and an average operation time, with the record other than the exception record being a processing target.

Figures 16, 17:
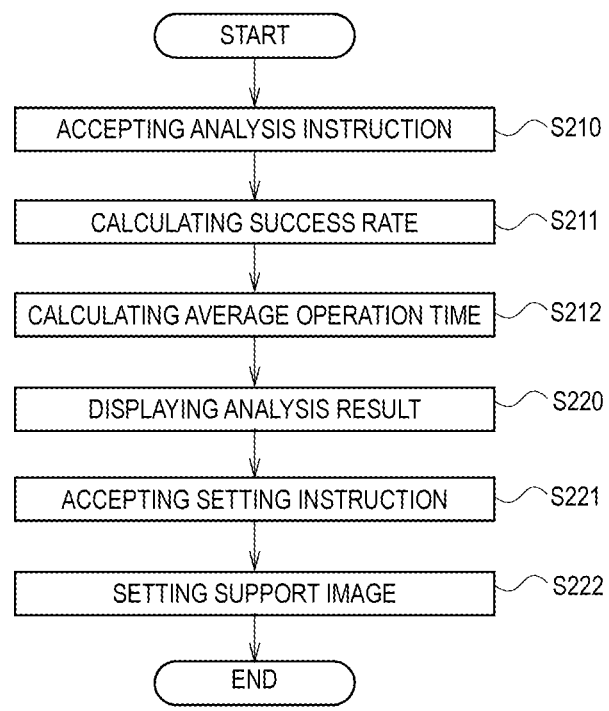
FIG. 16 is a flowchart illustrating a support image setting processing according to a second modification example.
FIG. 17 is an explanatory table illustrating a fourth modification example.

As a second modification example, a managing device 310 may display an analysis result on a display unit 315. Further, the managing device 310 may set a support image of an operation in accordance with an input from a user who has checked the analysis result. FIG. 16 is a flowchart illustrating a support image setting processing by the managing device 310 according to the second modification example. Note that in FIG. 16, the same number is given to a processing the same as the processing illustrated in FIG. 13. In this example, after a processing of S212, the CPU 311 of the managing device 310 proceeds the processing to S220. In S220, the CPU 311 of the managing device 310 displays the analysis result (display processing). In other words, the CPU 311 displays a candidate ID, an average operation time, and a success rate in association with one another, on the display unit 315. Next, in S221, the CPU 311 of the managing device 310 accepts a selection instruction of the support image candidate from the user (accepting processing). Next, in S222, the CPU 311 of the managing device 310 sets the support image candidate according to the selection instruction as a support image of the operation (setting processing).

As a third modification example, a managing device 310 may store an operation result also for a support image which is selected and set from support image candidates, similarly to in the processing of S209. Then, the managing device 310 performs processings of S210 to S212 as well as S220 which are illustrated in FIG. 16, to an operation result for the support image, and displays an analysis result. Then, when receiving an editing instruction for the support image from a user (accepting processing), the managing device 310 edits the support image in accordance with the editing instruction (editing processing). As the editing processing, there can be cited a processing to alter a sentence of a text which guides an operation presented in the support image, a processing to alter a display position of a text or the like which is presented in the support image, and so on, for example.

As a fourth modification example, a managing device 310 may perform an analysis processing in relation to an operation result for each of operation attributes such as an operation time zone and an operator attribute code, the operation attributes being included in an operation result table 334. For example, a CPU 311 of the managing device 310 may calculate a success rate for each time zone, as illustrated in FIG. 17. Further, as another example, a CPU 311 of a managing device 311 may calculate a success rate for each operator attribute code. Further, the CPU 311 may display such analysis results on a display unit 315.

As a fifth modification example, an AR display device 300 is not limited to an optical see-through displayer. As another example, the AR display device 300 may be a video see-through displayer. In this case, in an AR display processing (S204) illustrated in FIG. 11, a CPU 301 of the AR display device 300 controls a photographing unit 307 to photograph an image of an inspection target, and displays a video picture of a reality space as a photographed image, on a display unit 305. Then, the CPU 301 of the AR display device 300 displays a support image candidate superimposed on the video picture of the inspection target of the reality space, the video picture being displayed on the display unit 305. Further, also at the time of displaying a support image, the AR display device 300 similarly displays the support image superimposed on the video image of the reality space as the photographed image.

Further, as a sixth modification example, an AR display device 300 not only makes information related to an operation result (operation time, success or failure of operation, yield) or an analysis result (success rate, average operation time, average yield, etc.) displayed on a screen, but also may output the above to a form or transmit the above to an operation manager or the like by mail automatically, as illustrated in FIG. 18.

Thereby, the manager of the operation can analyze what operation instruction is appropriate as an operation instruction by AR, while referring to the above results and so on. For example, it can be judged that the operation instruction with a high success rate or the operation instruction with a short operation time is the operation instruction which facilitates the operation for an operator. Then, the operation manager can also pick up the operation instruction by AR whose content should be revised, based on the above analysis. Thereby, it becomes possible to improve the operation instruction appropriately, which leads to improvement of an operation accuracy of the operator.

Further, the CPU 311 of the managing device 310 can analyze the operation result for each attribute of the operator, by referring to the operator attribute table, based on the operation attribute code of the operation result table. The operation manager can perform analysis for each operator attribute, based on the analysis result for each operator attribute.

For example, even if C (unit by action) is good as an operation support image based on the analysis result for all the operators, there is a possibility that A (collective) brings about a better result as the operation support image, in a case where only an expert operator who has operation experience of certain years or more is considered. A configuration may be such that the operation support image can be set for each operation experience year, based on the above result.

Hereinabove, according to each embodiment described above, it is possible to make the operation using AR display further efficient.

Hereinabove, preferred embodiments of the present invention have been described in detail, but the present invention should not be limited to the specific embodiments and various alternation and modification are possible within a range of the scope of the present invention that is disclosed in the claims.

The invention claimed is:

1. An operation support device comprising:
   an acceptor configured to accept an operation result of success or failure of an operation by an operator, the operation result being obtained in a case where an optical see-through displayer worn by the operator displays a support image candidate for the operation by the operator superimposed on a reality space;
   a storing unit configured to store each support image candidate out of a plurality of the support image candidates for the operation and the operation result in a memory, associating the support image candidate with the operation result being in a case where the support image candidate is displayed; and
   a decider configured to decide the support image candidate to be the support image of the operation from among the plurality of the support image candidates, based on the operation result.

2. The operation support device according to claim 1, further comprising
   a specifier configured to specify a success rate of the operation for each of the support image candidates, based on the operation result,
   wherein the decider decides the support image candidate, based on the success rate.

3. The operation support device according to claim 2,
   wherein the storing unit further stores an operation time taken by the operation in a case where the support image candidate is displayed, in association with the support image candidate, and
   wherein the decider decides the support image candidate, based on the operation time and the success rate.

4. The operation support device according to claim 1, further comprising
   a transmitter configured to transmit the support image decided by the decider to the optical see-through displayer.

5. An operation support device comprising:
   an acceptor configured to accept an operation result of success or failure of an operation by an operator, the operation result being obtained in a case where an optical see-through displayer worn by the operator displays a support image candidate for the operation by the operator superimposed on a reality space;
   a storing unit configured to store each support image candidate out of a plurality of the support image candidates for the operation and the operation result in a memory, associating the support image candidate with the operation result being in a case where the support image is displayed;
   an analyzer configured to analyze the operation result for each of the support image candidates; and
   a displayer configured to display an analysis result by the analyzer.

6. The operation support device according to claim 5, further comprising:
   an acceptor configured to accept a selection instruction of the support image candidate in response to display of the displayer; and
   a decider configured to decide the support image candidate according to the selection instruction as the support image of the operation.

7. An operation support device comprising:
   an acceptor configured to accept an operation result of success or failure of an operation by an operator, the operation result being obtained in a case where an optical see-through displayer worn by the operator displays a support image of the operation by the operator superimposed on a reality space;
   a storing unit configured to store an operation attribute and the operation result in association with each other, in a memory;
   an analyzer configured to analyze the operation result for each of the operation attributes; and
   a displayer configured to display an analysis result by the analyzer.

8. The operation support device according to claim 7, further comprising:
   an acceptor configured to accept an editing instruction of the support image according to display of the displayer; and
   an editor configured to edit the support image in accordance with the editing instruction.

9. An operation support device comprising:
   an acceptor configured to accept an operation result of success or failure of an operation by an operator, the operation result being obtained in a case where a display device worn by the operator and capable of displaying another image superimposed on a photographed image of a reality space displays a support image candidate for the operation by the operator superimposed on the photographed image of the reality space;
   a storing unit configured to store each support image candidate out of a plurality of the support image candidates for the operation and the operation result in a memory, associating the support image candidate with the operation result being in a case where the support image candidate is displayed; and
   a decider configured to decide the support image candidate to be the support image of the operation from among the plurality of the support image candidates, based on the operation result.

10. An operation support device comprising:
    a storing unit configured to store, in a memory, information related to an operation result by an operator, in association with information specifying each of a plurality of the support image candidates for an operation, the operation result being in a case where a display device displays a support image candidate for the operation by the operator superimposed on a photographed image of the reality space, the display device being worn by the operator and capable of displaying another image superimposed on the photographed image of the reality space;
an analyzer configured to analyze the operation result for each of the support image candidates; and
an outputter configured to output an analysis result by the analyzer.

11. An operation support device comprising:
an acceptor configured to accept an operation result of success or failure of an operation by an operator, the operation result being obtained in a case where a display device worn by the operator and capable of displaying another image superimposed on a photographed image of a reality space displays a support image of the operation by the operator superimposed on the photographed image of the reality space;
a storing unit configured to store an operation attribute and the operation result in association with each other, in a memory;
an analyzer configured to analyze the operation result for each of the operation attributes; and
a displayer configured to display an analysis result by the analyzer.

12. An operation support method executed by an operation support device, the operation support method comprising:
an accepting step configured to accept an operation result of success or failure of an operation by an operator, the operation result being obtained in a case where an optical see-through displayer worn by the operator displays a support image candidate for the operation by the operator superimposed on a reality space;
a storing step configured to store each support image candidate out of a plurality of the support image candidates for the operation and the operation result in a memory, associating the support image candidate with the operation result being in a case where the support image candidate is displayed; and
a deciding step configured to decide the support image candidate to be the support image of the operation from among the plurality of the support image candidates, based on the operation result.

13. An operation support method executed by an operation support device, the operation support method comprising:
a storing step configured to store, in a memory, information related to an operation result by an operator, in association with information specifying each of a plurality of the support image candidates for the operation, the information being related to an operation result being obtained in a case where a display device worn by the operator and capable of displaying another image superimposed on a photographed image of a reality space displays a support image candidate for an operation by the operator superimposed on the photographed image of the reality space;
an analyzing step configured to analyze the operation result for each of the support image candidates; and
an outputting step configured to output an analysis result by the analyzing step.

14. An operation support method executed by an operation support device, the operation support method comprising:
an accepting step configured to accept an operation result of success or failure of an operation by an operator, the operation result being obtained in a case where an optical see-through displayer worn by the operator displays a support image of the operation by the operator superimposed on a reality space;
a storing step configured to store an operation attribute and the operation result in association with each other, in a memory;
an analyzing step configured to analyze the operation result for each of the operation attributes; and
a displaying step configured to display an analysis result obtained in the analyzing step.

15. A non-transitory computer readable recording medium with a program causing a computer to function as:
an acceptor configured to accept an operation result of success or failure of an operation by an operator, the operation result being obtained in a case where an optical see-through displayer worn by the operator displays a support image candidate for the operation by the operator superimposed on a reality space;
a storing unit configured to store each support image candidate out of a plurality of the support image candidates for the operation and the operation result in a memory, associating the support image candidate with the operation result being in a case where the support image candidate is displayed; and
a decider configured to decide the support image candidate to be the support image of the operation from among the plurality of the support image candidates, based on the operation result.

16. A non-transitory computer readable recording medium with a program causing a computer to function as:
a storing unit configured to store, in a memory, information related to an operation result by an operator, in association with information specifying each of a plurality of the support image candidates for the operation, the information related to an operation result being obtained in a case where a display device worn by the operator and capable of displaying another image superimposed on a photographed image of a reality space displays a support image candidate for an operation by the operator superimposed on the photographed image of the reality space;
an analyzer configured to analyze the operation result for each of the support image candidates; and
an outputter configured to output an analysis result by the analyzer.

17. A non-transitory computer readable recording medium with a program causing a computer to function as:
an acceptor configured to accept an operation result of success or failure of an operation by an operator, the operation result being obtained in a case where an optical see-through displayer worn by the operator displays a support image of the operation by the operator superimposed on a reality space;
a storing unit configured to store an operation attribute and the operation result in association with each other, in a memory;
an analyzer configured to analyze the operation result for each of the operation attributes; and a displayer configured to display an analysis result by the analyzer.

* * * * *